United States Patent [19]

Gioso

[11] Patent Number: 4,512,503

[45] Date of Patent: Apr. 23, 1985

[54] ALL PURPOSE VEHICLE TRAVEL ORGANIZER

[76] Inventor: John Gioso, 1908-B Soho Pl., Coram, N.Y. 11727

[21] Appl. No.: 629,273

[22] Filed: Jul. 9, 1984

[51] Int. Cl.³ .......................... B60R 7/00; B60R 7/04; B65D 85/00
[52] U.S. Cl. .............. 224/42.42 R; 206/371; 206/216; 206/335; 296/37.8; 297/194; 224/275; 220/23
[58] Field of Search ................ 206/371, 335, 216; 224/42.42 R, 275; 220/23; 296/37.8; 297/194

[56] References Cited

U.S. PATENT DOCUMENTS

| | | | |
|---|---|---|---|
| 3,061,394 | 10/1962 | Whetstone | 224/42.42 R |
| 3,136,461 | 6/1964 | Gregg, Jr. | 224/42.42 R |
| 3,873,010 | 3/1975 | Patterson | 206/216 |
| 4,300,709 | 11/1981 | Page, Jr. | 224/42.42 R |
| 4,453,759 | 6/1984 | Kathiria | 220/23 |

Primary Examiner—William T. Dixson, Jr.
Attorney, Agent, or Firm—Richard L. Miller

[57] ABSTRACT

An all purpose vehicle travel organizer which rests on a vehicle seat and has a fixed tray surmounted by a sliding tray. Each of the trays may contain a variety of items such as pens, pencils, tape cassettes, and cigarette packs and lighter. Special threaded drinking cups screw into threaded cylindrical openings on top of the sliding tray. A hasp and detent lock system locks the sliding tray into position once the tray position has been selected. The travel organizer also holds and organizes cans, bottles, coinage and many miscellaneous items. A built-in light provides illumination for the fixed tray or for maps or any other objects. The organizer may be tied to a seat using tie down loops provided or may be attached using hook and loop pile type material fasteners.

14 Claims, 4 Drawing Figures

ALL PURPOSE VEHICLE TRAVEL ORGANIZER

BACKGROUND OF THE INVENTION

The present invention relates generally to the field of storage devices and, more specifically, to the field of travel organizers for vehicles such as truck and automobiles.

At the present state of the art there are a number of vehicle organizers available, however, each of these is designed for a specific carrying purpose, such as: coin holder, change holder, cassette tape holder, can holder, cup holder, etc. No vehicle organizer has yet been provided which organizes a full range of normally transported items. Also, none of the existing vehicle organizers provides layered storage; i.e. all storage takes place on the surface level of the organizer assuming that access to all items have exactly the same priority.

SUMMARY OF THE INVENTION

It is, therefore, a primary object of the present invention to provide an all purpose vehicle travel organizer which has a sliding tray to hold an assortment of high priority items such as paper and books, drinks, a cigarette case, tapes, a lighter, etcetera.

A further object is to provide an all purpose vehicle travel organizer which has a fixed tray nested under the sliding tray so that the fixed tray holds an assortment of lower priority items such as additional cassette tapes and miscellaneous items.

A yet further object is to provide an all purpose vehicle travel organizer in which the sliding tray may be locked into a number of fixed positions by using a hasp and detent system.

A still further object is to provide an all purpose vehicle travel organizer in which accessory spill proof drinking cups screw into threaded cylindrical openings in the sliding tray so that drinks may be place thereon securely even while the vehicle is in motion.

A further object is to provide an all purpose vehicle travel organizer which contains on its outer panels a number of pen and pencil holders, pockets, can holders and a change holder with spring loaded compartments for different sizes of coinage.

Another further object is to provide an all purpose vehicle travel organizer which has tie-down loops for securing the travel organizer to a vehicle seat.

Another yet further object is to provide an all purpose vehicle travel organizer which has strips of hook and loop pile fastener type material bonded to its bottom surface so that if mating fastener strips are attached to a vehicle seat the vehicle travel organizer may be easily installed.

Another yet further object is to provide an all purpose vehicle travel organizer which has a built-in light to illuminate the fixed tray or any map or other desired object.

Another still further object is to provide an all purpose vehicle travel organizer which has a carrying handle which allows a user to easily transport the travel organizer.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
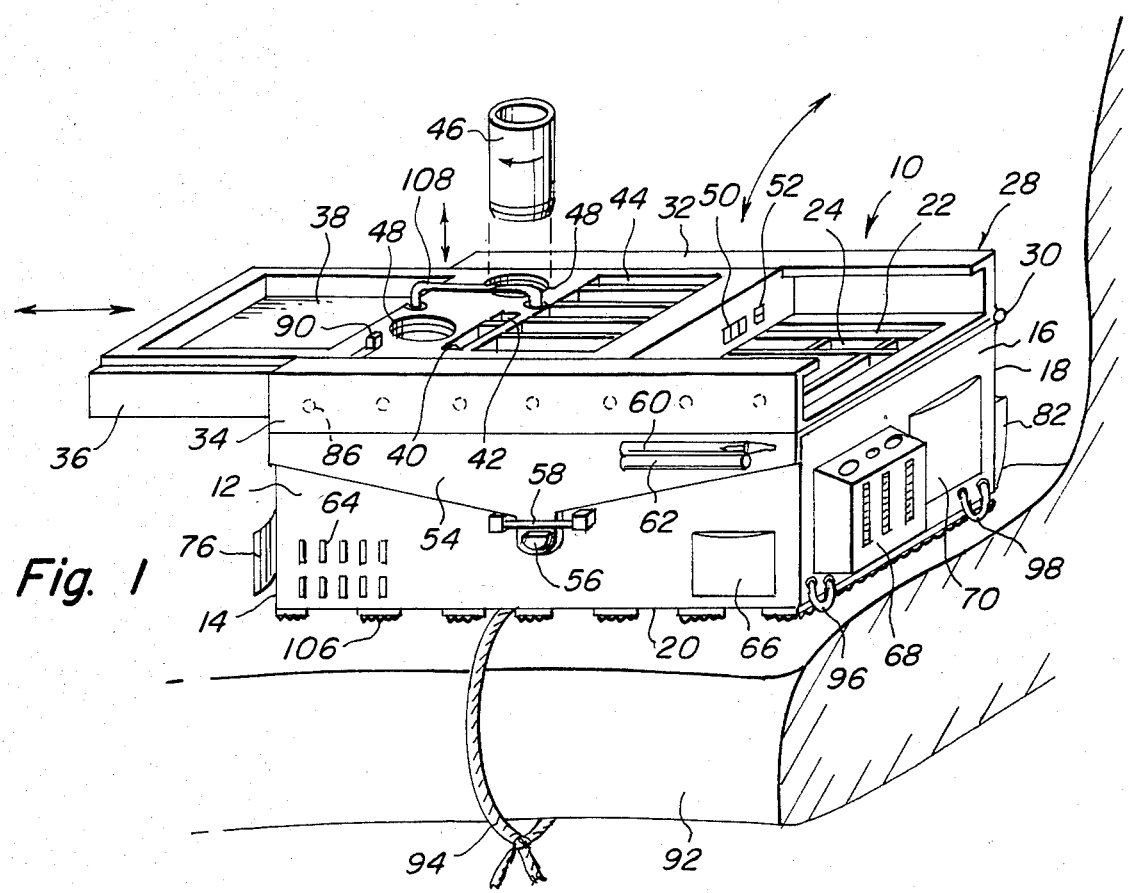
FIG. 1 is a perspective view of the invention typically mounted on the front seat of a motor vehicle.
Figure 2:
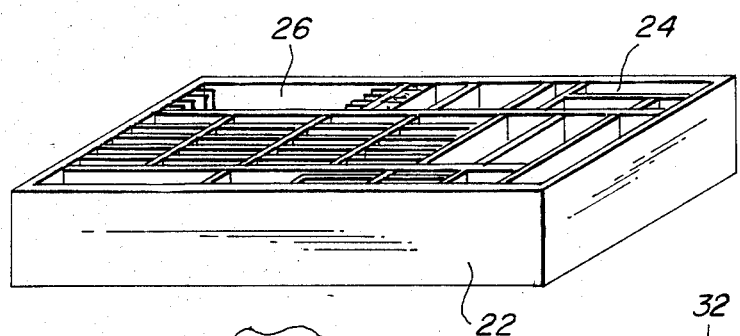
FIG. 2 is a perspective view of an inner tray removed therefrom.

The base of the invention 10 may be visualized as a rectangular parallelepiped structure consisting of five panels: a front panel 12, a left side panel 14, a right side panel 16, a rear panel 18 and a bottom panel 20. The top of this structure is left open so that fixed tray 22 may nest onto the top of the base. A number of rectangular compartments typified by 24 are provided as well as a special compartment 26 for maps.

Hinged track lid 28 which hinges to rear panel 18 at hinge 30 is configured so as to provide a track with retaining overhangs 32 and 34 which define and limit the travel of sliding tray 36. Sliding tray 36 has a paper and book holding recess 38, cigarette package recess 40, cigarette lighter recess 42 and five cassette recesses typified by 44. Accessory drinking cups with threaded bases such as 46 are screwed into cylindrical threaded openings 48 to prevent spilling liquids contained in the cups even when the vehicle is in motion. Edge mounted light 50 which is controlled by light switch 52 is used to illuminate the fixed tray 22 below or other objects such as road maps. Locking flap 54 overlaps front panel 12 and is locked to 12 by spring biased latch 56 which engages latch pin 58. Two pen holders 60 and 62, constructed of bands of an elastic material, are attached to locking flap 54.

Front panel 12 has two pen or pencil holders typified by 62, ten plastic bands 64 for miscellaneous items such as a pulp thermometer, and a pocket 66, made of an elastic material.

Right side panel 16 has a change holder 68 with spring loaded compartments which dispense various coins; and, a pocket 70, made of an elastic material.

Left side panel 14 has two can holders 72 and 76 made of bands of elastic material. Can holder 72 holds can 74 shown in phantom. Likewise, can holder 76 holds bottle 78 shown in phantom. Two pen holders, typified by 80 are placed between can holders 72 and 76.

Rear panel 18 has a log book and clip board holder pocket 82 which holds clipboards snugly in place, and additional tapes.

Figure 4:
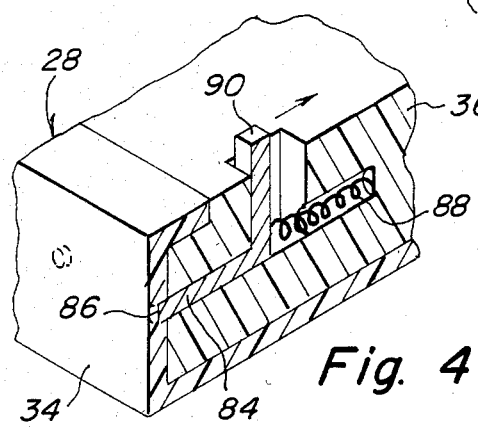
FIG. 4 is a partial perspective detail view of the hasp and detent system used to secure the sliding tray.
Figure 3:
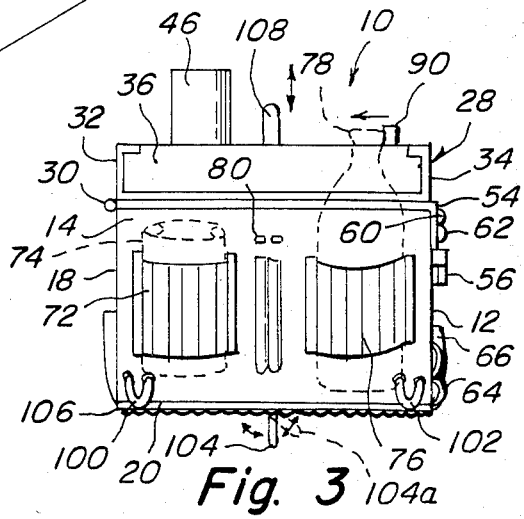
FIG. 3 is a left side view of the invention.

The manner in which sliding tray 36 is locked into position may best be understood with reference to FIGS. 1 and 4. A hasp 84 which is biased by helical coiled spring 88 engages detent 86. If sliding tray 36 needs to be re-positioned, then a counter-biasing force is applied to activating lever 90 sliding tray 36 may than be re-positioned so that hasp 84 is aligned with one of the other detents, and counter-biasing force on activating lever 90 is than removed.

There are two systems for securing the invention 10 to the seat 92 of a motor vehicle. A rope such as 94 may be passed through any of the tie down loops such as 96 and 98 on right side panel 16 and tie down loops 100 and 102 on left side panel 14. Bottom tie down loops such as 104 fold out of the way as in 104a so that fabric upholstery on seat 92 is not damaged. Strips of hook and loop pile fastener type material typified by strip 106 provide a second attachment means. These strips are bonded to the underneath of bottom panel 20. Mating sections may be attached to a car seat so that when the invention 10 is placed upon a seat so equipped, the invention 10 is held securely in place.

A carrying handle 108 which is centrally mounted to sliding tray 36 is used to transport the invention 10 when sliding tray 36 is re-positioned to its central position.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An all purpose vehicle travel, comprising in combination:
   (a) a base in the shape of a rectangular parallelepiped with rigid bottom panel, rigid front panel, rigid rear panel, two rigid side panels and an open top; wherein said base is of such dimension as to fit on the upper surface of a vehicle seat;
   (b) a fixed rectangular tray which nests into said open top such that the top of said fixed rectangular tray is flush with the top of said open top;
   (c) a rectangular hinged track lid together with associated hinge, wherein said rectangular hinged track lid has the same rectangular base dimension as said open top and wherein said hinged track lid has two vertical planar extensions extending the entire length of said front and said rear panels; wherein each of said vertical planar extensions has a perpendicular extension directed inwards, thereby forming a lengthwise track with overhang;
   (d) a sliding tray whose travel is defined by said lengthwise track with overhang; and
   (e) means for locking and unlocking said sliding tray so as to provide access to said fixed tray and to secure offset position of said sliding tray.

2. An all purpose vehicle travel organizer, as recited in claim 1, wherein said fixed rectangular tray contains a multiplicity of rectangular compartments defined by a matrix of vertical members of various dimensions.

3. An all purpose vehicle travel organizer, as recited in claim 1, wherein said sliding tray comprises a rectangular paper and book holding recess; a cigarette package recess; a cigarette lighter recess; and, a multiplicity of cassette tape recesses.

4. An all purpose vehicle travel organizer, as recited in claim 1, wherein said sliding tray further comprises at least one threaded cylindrical aperture which mates with accessory drinking cups with matching external threads in order to allow a user to secure said accessory drinking cups even while said vehicle is in motion.

5. An all purpose vehicle travel organizer, as recited in claim 1, wherein said sliding tray further comprises a central vertically mounted retractable carrying handle, whereby, when said sliding tray is locked into a centered position said handle may be used to transport said vehicle travel organizer.

6. An all purpose vehicle travel organizer, as recited in claim 1, wherein said sliding tray further comprises an edge mounted light together with associated light switch, whereby said edge mounted light may be used to illuminate said compartments in said fixed tray and also to illuminate any other desired object.

7. An all purpose vehicle travel organizer, as recited in claim 1, wherein said front panel further comprises a multiplicity of pen holders made of bands of elastic material and at least one pocket made of an elastic material.

8. An all purpose vehicle travel organizer, as recited in claim 1, wherein one of said side panels further comprises at least one can holder made of bands of elastic material and at least one pen holder made of bands of elastic material.

9. An all purpose vehicle travel organizer, as recited in claim 1, wherein the other said side panel further comprises a change holder with spring loaded compartments which contain coin currency of various diameters and at least one pocket made of an elastic material.

10. An all purpose vehicle travel organizer, as recited in claim 1, wherein said rear panel further comprises a clip board holder pouch which securely holds a pad or clip board.

11. An all purpose vehicle travel organizer, as recited in claim 1, wherein said rectangular hinged track lid further comprises a downward facing overlapping flap with a latch which engages a latch pin mounted to said front panel; and, a least one pen holder made of bands of an elastic material.

12. An all purpose vehicle travel organizer, as recited in claim 1, wherein said means for locking and unlocking said sliding tray so as to provide access to said fixed tray and to secure offset position of said sliding tray comprises a hasp biased by a helical spring wherein said hasp and helical spring are integral to said sliding tray; said hasp faces forward and engages one of a multiplicity of detents in said rectangular hinged track lid; and, a perpendicular upwards extension of said hasp forms an activating lever whereby a user may position and lock said sliding tray by applying a counter-biasing force to said activating lever thereby unlocking said sliding tray; move said sliding tray to a desired position; and, finally, remove said counter-biasing force permitting said hasp to engage with one of said detents thereby locking said tray.

13. An all purpose vehicle travel organizer, as recited in claim 1, further comprising tie-down loops attached to the lower portion of any of said panels.

14. An all purpose vehicle travel organizer, as recited in claim 1, further comprising strips of hook and loop pile fastener type material bonded to the underneath surface of said bottom panel whereby mating hook and loop pile fastener type material may be bonded to the top surface of a vehicle seat in such manner that when said all purpose vehicle travel organizer is placed in position it is thereby secured.

* * * * *